(12) United States Patent  (10) Patent No.: US 8,585,083 B2
Kanno  (45) Date of Patent: Nov. 19, 2013

(54) PASSENGER AIRBAG DEVICE

(75) Inventor: Yuki Kanno, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/479,776

(22) Filed: May 24, 2012

(65) Prior Publication Data

US 2012/0299274 A1  Nov. 29, 2012

(30) Foreign Application Priority Data

May 26, 2011 (JP) ................................. 2011-118385

(51) Int. Cl.
*B60R 21/205* (2011.01)
*B60R 21/215* (2011.01)
*B60R 21/20* (2011.01)

(52) U.S. Cl.
USPC ...................................... 280/732; 280/728.3

(58) Field of Classification Search
USPC ............................................ 280/732, 728.3
See application file for complete search history.

(56) References Cited

U.S. PATENT DOCUMENTS

| 7,934,745 B2 * | 5/2011 | Hayashi ..................... 280/728.3 |
| 2005/0052002 A1 * | 3/2005 | Hayashi et al. ............ 280/728.3 |
| 2007/0029763 A1 * | 2/2007 | Hayashi ..................... 280/728.3 |
| 2007/0278773 A1 * | 12/2007 | Cowelchuck et al. ........ 280/732 |
| 2008/0106077 A1 * | 5/2008 | Yanai ......................... 280/728.3 |

FOREIGN PATENT DOCUMENTS

JP  2008-114747 A  5/2008

* cited by examiner

*Primary Examiner* — Ruth Ilan
(74) *Attorney, Agent, or Firm* — Fitch, Even, Tabin & Flannery, LLP

(57) ABSTRACT

An airbag cover main body portion is provided including a plate-shaped opening portion, a flat portion provided to at least a region further on an inner peripheral side than the opening portion, and a plurality of welding auxiliary ribs that is provided to protrude from a region further on an outer peripheral side than the opening portion and maintain a flatness of a surface of the opening portion, wherein: a frame-shaped body includes a flap portion that tears and deploys by pressure imparted by an inflation load, ribs to be welded that are provided at least to the flap portion, facing the flat portion, and a plurality of auxiliary ribs to be welded; and the ribs to be welded and the flat portion as well as the auxiliary ribs to be welded and the welding auxiliary ribs are respectively joined by vibration welding while respectively in contact with each other.

3 Claims, 7 Drawing Sheets

PASSENGER AIRBAG DEVICE

CROSS-REFERENCE TO RELATED APPLICATION

This application claims priority under 35 U.S.C. §119 to Japanese Patent Application No. JP2011-118385 filed on May 26, 2011, the entire content of which is hereby incorporated herein by reference in its entirety.

FIELD OF THE INVENTION

The present invention relates to a passenger airbag apparatus that restrains a passenger.

BACKGROUND OF THE INVENTION

A passenger airbag apparatus that restrains a passenger is provided in an instrument panel of a vehicle. The passenger airbag apparatus secures in place an airbag cover provided as a portion of the outer appearance of the instrument panel and a frame-shaped body that uses a rear surface of the airbag cover as an installation surface; the frame-shaped body is then fitted with components including a retainer, airbag, and inflator. When the frame-shaped body is fixed to the rear surface side of the instrument panel, the frame-shaped body is often welded using a welding technique (such as vibration welding) since these components are made of resin (see JP, A, 2008-114747, for example).

In recent years, the instrument panel of a vehicle has sometimes been designed with an outer appearance that has an overall curved surface shape. This is in response to various factors, including the design perspective, vehicle interior layout restrictions, and to ensure various functionalities. In such a case, in locations where this curved surface shape hinders vibration operations related to vibration welding, there has been high demand to devise a structure that is conducive to vibration welding, making it possible to evenly join the areas where the airbag cover main body portion and frame-shaped body face each other. According to the above prior art, a plurality of ribs is provided to the rear surface side of the instrument panel so as to extend across the entire opening portion of the airbag cover that tears open on a tear line, making it possible to evenly join these ribs and the installation surface of the frame-shaped body facing these ribs.

The instrument panel comprises an opening portion of a plate shape that is divided by a tear line for tearing. This opening portion tears open on the tear line by the pressure imparted by the inflation load of the airbag, deploying toward the occupant. According to the above prior art, the plurality of ribs is mainly provided to the rear surface of the opening portion.

SUMMARY OF THE INVENTION

Since the opening portion is a part that opens toward the occupant when the airbag is activated as described above, various restrictions exist in terms of structure and strength. Thus, rather than welding together the ribs provided to the rear surface of the opening portion of the instrument panel and the installation surface provided at a location corresponding to the opening portion of the frame-shaped body by vibration welding, establishing the opening portion of the instrument panel as a flat surface without ribs and executing vibration welding with the ribs provided to the installation surface side of the frame-shaped body offers a simpler structure and should make it possible to more readily improve the joining strength. Nevertheless, the above prior art does not particular take such points into consideration.

It is therefore an object of the present invention to provide a passenger airbag apparatus that is capable of maintaining high joining strength based on a simple structure.

In order to achieve the above-described object, according to the first invention, there is provided a passenger airbag apparatus provided in a vehicle, comprising: a passenger airbag that inflates and restrain a passenger; a retainer that houses the passenger airbag folded in a predetermined form; an inflator that supplies gas to the passenger airbag so that the passenger airbag protrudes from the retainer and inflates in response to a collision to the vehicle; and an airbag cover; wherein: the airbag cover comprises: an airbag cover main body portion that extends facing the passenger and covers the passenger airbag housed in the retainer provided on a side opposite the passenger; and a frame-shaped body provided to the airbag cover main body portion, on a side opposite the passenger; the airbag cover main body portion comprises: a tear line for airbag cover tearing; a plate-shaped opening portion that is divided by the tear line and opens and deploys at the tear line by a pressure imparted by an inflation load of the passenger airbag; a flat portion provided on a surface of the airbag cover main body portion that is opposite to the passenger, and provided at least in a region on an inner peripheral side than the opening portion; and a plurality of welding auxiliary ribs that is provided to protrude from a region of a rear surface of the airbag cover main body portion that is on an outer peripheral side than the opening portion, and maintain a flatness of a surface of the opening portion in the region on the outer peripheral side than the opening portion; the frame-shaped body comprises: a tear line for tearing that is provided in a location corresponding to the tear line for airbag cover tearing; a flap portion that is divided by the tear line and tears and deploys at the tear line by the pressure imparted by the inflation load of the passenger airbag; a rib to be welded that is provided at least to the flap portion so as to face the flat portion; and a plurality of auxiliary ribs to be welded that is provided to locations on a flange portion formed on an outer side of the flap portion, respectively corresponding to the plurality of welding auxiliary ribs; and the airbag cover main body portion and the frame-shaped body are joined together by vibration welding wherein vibration is relatively applied in a vibration direction, with the rib to be welded and the flat portion in contact with each other and the auxiliary ribs to be welded and the welding auxiliary ribs in contact with each other.

According to the first aspect of the present invention, the inner peripheral side of the opening portion of the airbag cover main body portion of the instrument panel is a flat portion that is not provided with ribs, etc., and ribs to be welded are provided to at least a flap portion of the frame-shaped body corresponding to the opening portion so that they face the flat portion. By providing the ribs to the frame-shaped body side and avoiding rib installation to the opening portion where various restrictions exist in terms of structure and strength, the present invention makes it possible to easily improve the joining strength based on a simple structure, compared to the prior art structure in which ribs are provided to the opening portion.

On the other hand, when the outer appearance of the instrument panel constitutes an overall curved surface shape, the curvature generally increases toward the end portion side of the instrument panel. As a result, as is, it becomes difficult to evenly join the frame-shaped body by vibration welding in this region on end portion side that is highly curved. Here, according to the first aspect of the present invention, welding auxiliary ribs (for maintaining the flatness of the surface from the opening portion in the region further on the outer peripheral side than the opening portion) are provided on the outer peripheral side of the opening portion. With this arrangement, it is possible to increase the joining strength even in the region on the end portion side that exhibits high curvature.

In the way described above, according to the first aspect of the present invention, it is possible to maintain a high joining strength based on a simple structure.

According to the second invention, in the passenger airbag apparatus according to the first invention, the rib to be welded of the frame-shaped body comprises: a first rib provided to the flap portion; a second rib having a strength that is greater than the first rib, that is provided in a substantially ring shape to the flange portion, surrounding the flap portion; and a third rib that is provided so that it connects with the second rib in a region of the flange portion where the plurality of auxiliary ribs to be welded is not provided.

A first rib is provided to the flap portion and a second rib is further provided to the flange portion so as to surround the flap portion, as ribs to be welded and joined with the flat portion of the airbag cover main body portion. By making the strength of this second rib larger than that of the first rib, for example, it is possible to reliably improve the joining strength based on a simple structure.

Further, a third rib is further provided to the flange portion as a rib to be welded and joined with the flat portion of the airbag cover main body portion, thereby making it possible to further reliably improve the joining strength.

According to the third invention, in the passenger airbag apparatus according to the first invention, a width of the welding auxiliary rib is smaller than a width of the auxiliary rib to be welded.

By decreasing the width of the welding auxiliary ribs, it is possible to minimize the adverse effect on the outer appearance as viewed from the front of the instrument panel.

According to the present invention, in a configuration that joins the frame-shaped body and the airbag cover main body portion on the instrument panel side by vibration welding, it is possible to maintain a high joining strength based on a simple structure.

DETAILED DESCRIPTION OF PREFERRED EMBODIMENTS

Figure 1:
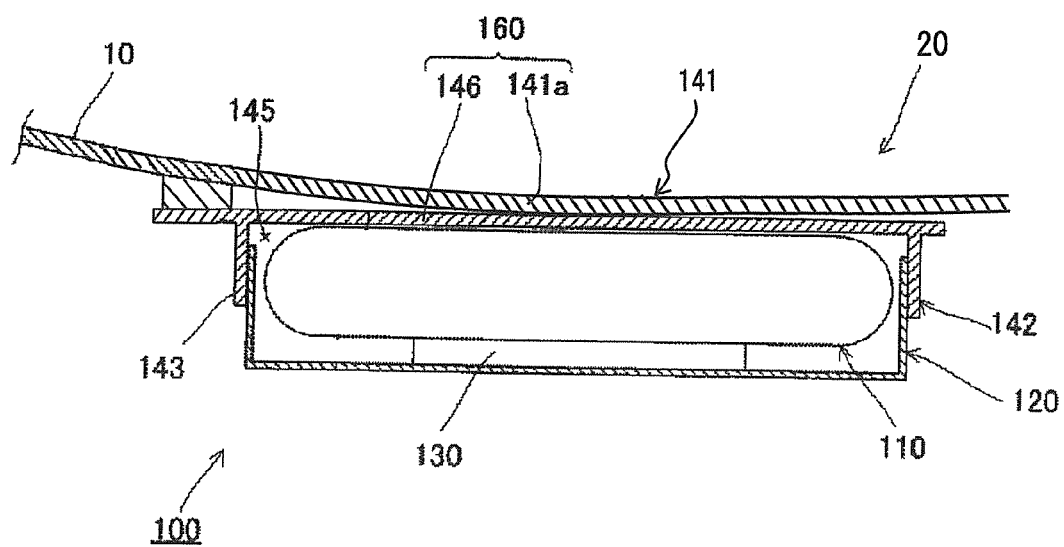
FIG. 1 is a cross-sectional view showing the schematic structure a passenger airbag apparatus according to an embodiment of the present invention.

An airbag apparatus 100 used in this embodiment constitutes a passenger airbag apparatus that is provided in front of the passenger seat of a vehicle (not particularly shown) and is configured to restrain a passenger by a passenger airbag when a vehicular accident occurs. FIG. 1 is a cross-sectional view of the cross-sectional structure of this airbag apparatus 100.

The airbag apparatus 100 of this embodiment mainly comprises an airbag 110, a retainer 120, an inflator 130, and an airbag cover 20.

When a vehicular accident occurs, the airbag 110 projects and inflates toward the passenger seat, and restrains, in an inflated state, the passenger seated in the passenger seat. The retainer 120 retains the airbag 110 in a predetermined folded state (constituting a roll fold, accordion fold, machine fold, or the like). The inflator 130 generates and supplies inflation gas to the airbag 110 at the time of a vehicular accident.

The airbag cover 20 is disposed on an instrument panel 10 of the vehicle. The instrument panel 10 is a panel body (also called a "dashboard") that extends laterally (in the vehicle width direction) in front of the driver seat and passenger seat in the vehicle interior, that is, between the front window and front seat passengers, and is defined as the panel body that extensively includes the overall panel, not just the panel around the instruments, such as the speedometer and tachometer in front of the driver seat, but also the portion where the airbag 110, etc., of the embodiment is mounted as well as the glove box that hold small items on the passenger seat side. Further, the instrument panel 10 may also be defined as including the car air-conditioning vents and the portion where the car stereo is stored.

Then, the airbag cover 20 covers the airbag 110 housed in the retainer 120. This airbag cover 20 comprises an airbag cover main body portion 141 and a frame-shaped body 142.

The airbag cover main body portion 141 constitutes a plate-shaped portion that extends facing the passenger. This airbag cover main body portion 141 is formed by a resin material such as a PP (polypropylene) material or TPO (thermoplastic elastomer olefin) material. The outer surface is sometimes covered by a resin skin.

A tear line 14 (refer to FIG. 2 described later) constituting a tear line for tearing open the airbag cover is formed on the rear surface of the airbag cover main body portion 141, near the center. This tear line 14 is typically an area thinned in the plate thickness direction of the airbag cover main body portion 141 by ultrasonic or laser machining, and is also referred to as "thinned portion" or "decreased portion." An opening portion 141a of the airbag cover main body portion 141 that is divided by this tear line 14 is deployed ("opened") along with a flap portion 146 described later by the tearing of the tear line 14 at the time of inflation of the airbag 110.

Note that this tear line 14 matches in part or in whole the actual tear line that tears along the tear line 14. That is, a tear line may be formed that exceeds the tear line 14 as long as the tear line 14 has the function of forming the tear line that causes the frame-shaped body 142 to transform into the desired torn form.

Further, the frame-shaped body 142 is joined to the rear surface of the airbag cover main body portion 141 (the details of the joining are described later). This frame-shaped body 142 comprises a cylindrical portion 143 of a rectangular cylindrical shape that is fixed to the retainer 120, and the flap portion 146 that makes it possible to open and close an upper opening 145 of the cylindrical portion 143 via a hinge portion (not shown). This flap portion 146 comprises a shape that generally matches the opening portion 141a, and is divided by a tear line 22 (refer to FIG. 5 described later) described later, tearing and deploying along with the opening portion 141a by the pressure imparted by the inflation load of the airbag 110.

A deployment door portion 160 includes the opening portion 141a on the airbag cover main body portion 141 side, and the flap portion 146 on the frame-shaped body 142 (retainer 120) side. In this deployment door portion 160, the opening portion 141a and the flap portion 146 are joined together when the airbag cover main body portion 141 and the frame-shaped body 142 are joined.

Figure 2:
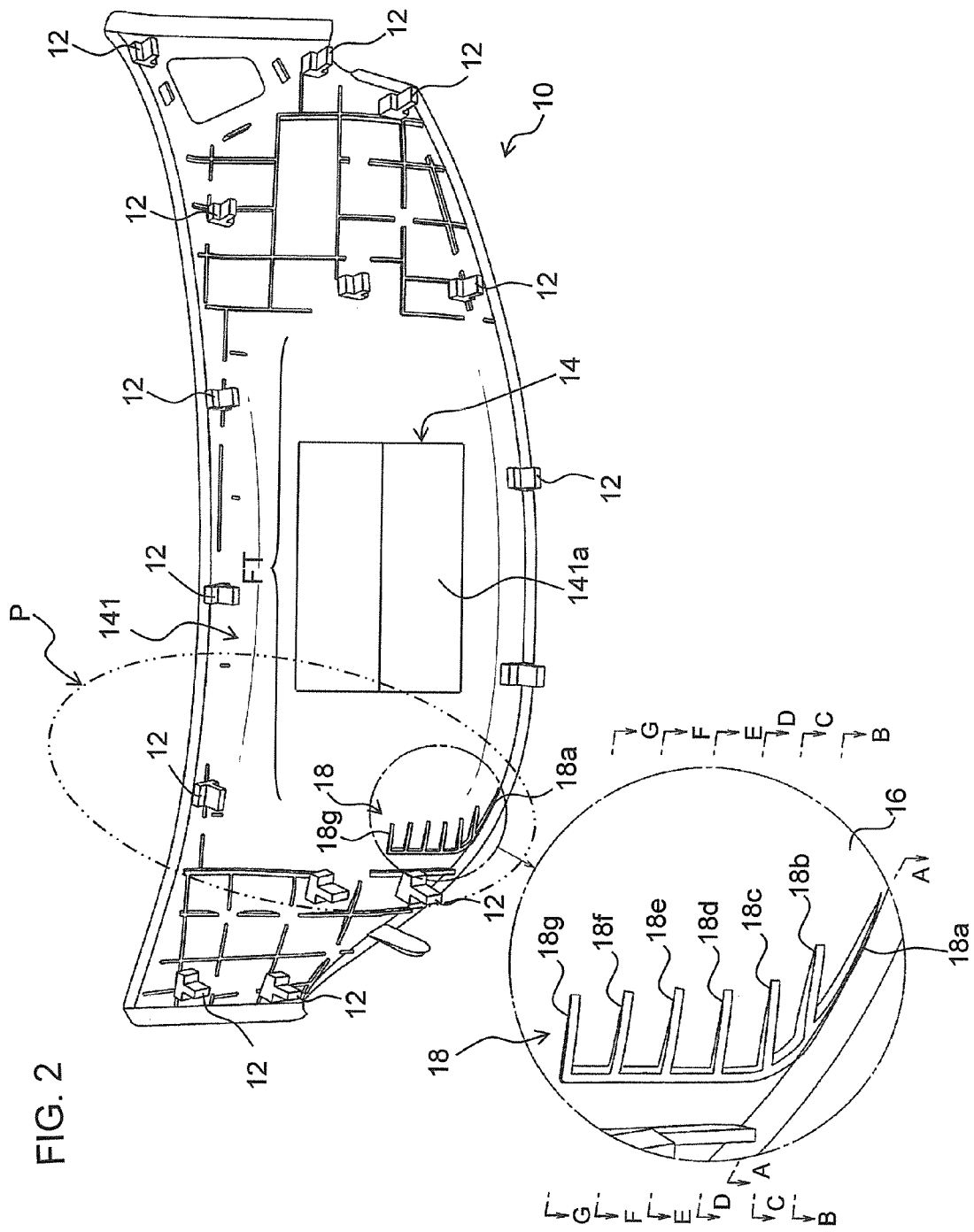
FIG. 2 is a rear view of the instrument panel, which includes the airbag cover main body portion.

FIG. 2 is a rear view of the instrument panel 10, which includes the airbag cover main body portion.

As shown in FIG. 2, the airbag cover main body portion 141 constitutes a portion of the outer appearance shape of the instrument panel 10 (not shown), and makes up the curved surface corresponding to that shape. Further, a plurality of leg portions 12 for connection with the vehicle body side is formed in a protruding manner on the rear surface of the instrument panel 10. Then, a plurality of welding auxiliary ribs 18a to 18g is formed in a protruding manner on the outer periphery side (on the left side in FIG. 2 in this example) of the opening portion 141a of the airbag cover main body portion 141, constituting a welding surface 18 of a predetermined range. A relatively wide range of the airbag cover main body portion 141, including the region on the inner peripheral side of the opening portion 141a and the region surrounding the opening portion 141a, serves as a flat portion FT to which ribs such as the welding auxiliary ribs 18a to 18g are not particularly provided.

Figure 3:
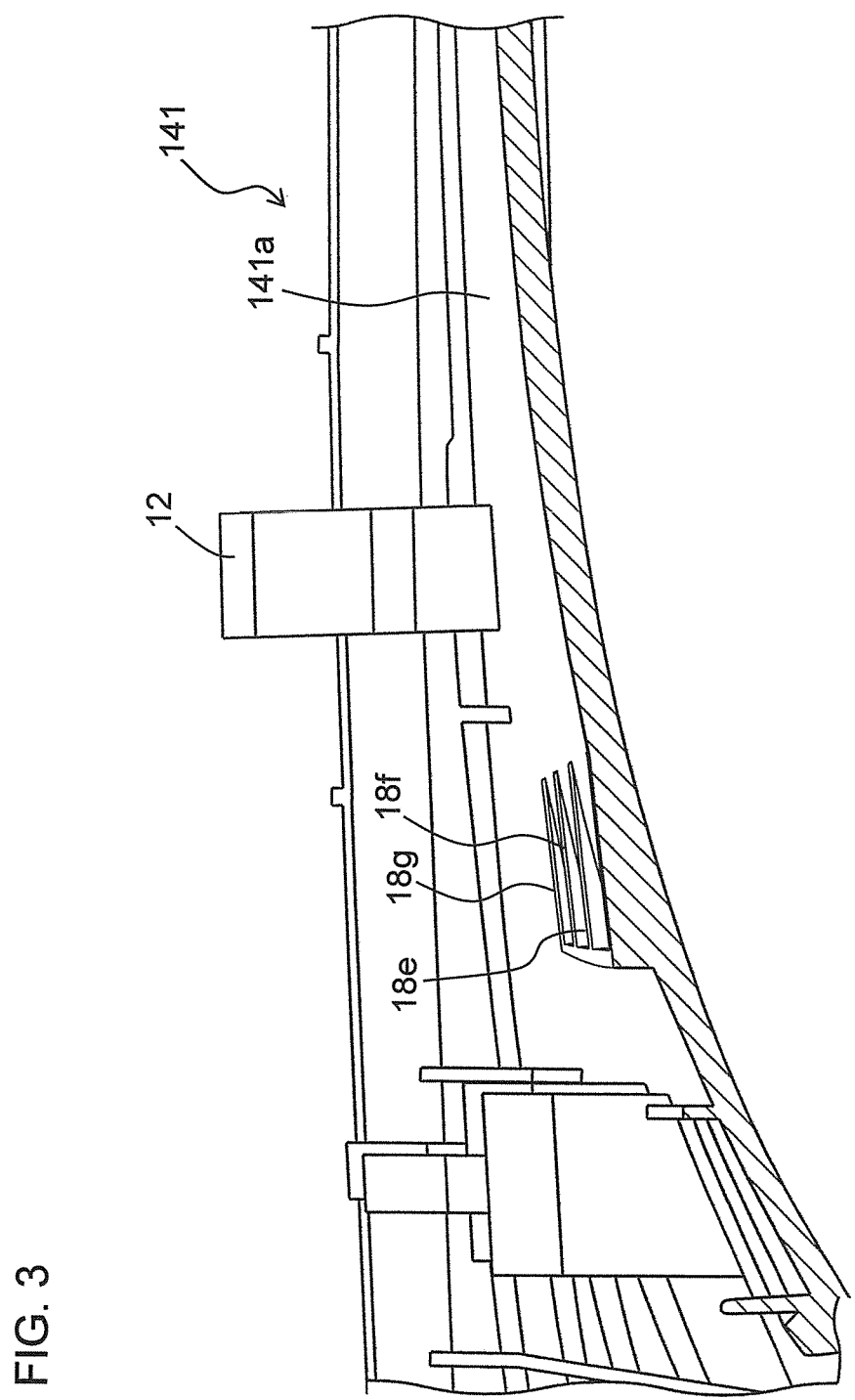
FIG. 3 is an enlarged cross-sectional view of area P of FIG. 2.
Figure 4A:
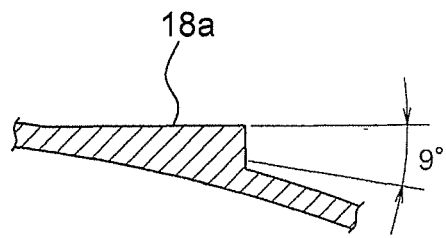
FIG. 4A is an enlarged cross-sectional view along line A-A of FIG. 2B.
Figure 4B:
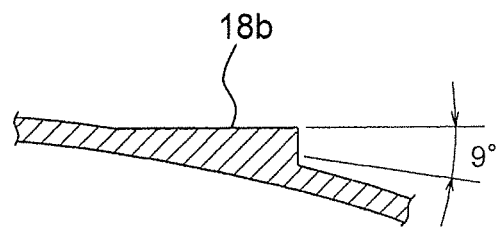
FIG. 4B is an enlarged cross-sectional view along line B-B of FIG. 2B.
Figure 4C:
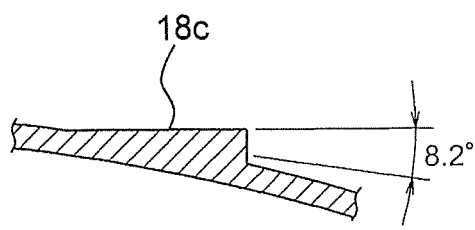
FIG. 4C is an enlarged cross-sectional view along line C-C of FIG. 2B.
Figure 4D:
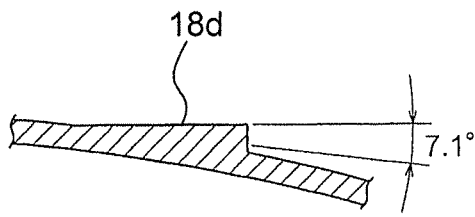
FIG. 4D is an enlarged cross-sectional view along line D-D of FIG. 2B.
Figure 4E:
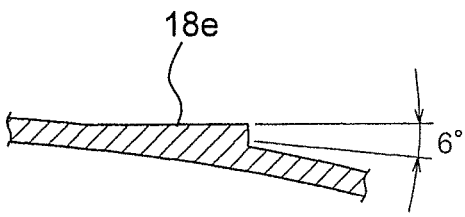
FIG. 4E is an enlarged cross-sectional view along line E-E of FIG. 2B.
Figure 4F:
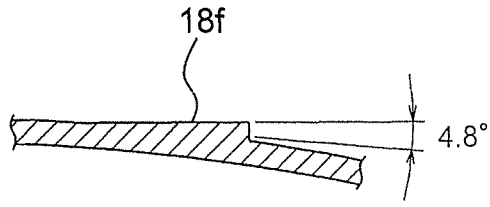
FIG. 4F is an enlarged cross-sectional view along line F-F of FIG. 2B.
Figure 4G:
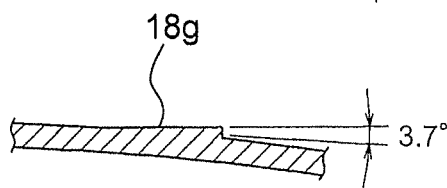
FIG. 4G is an enlarged cross-sectional view of line G-G of FIG. 2B.

The plurality of welding auxiliary ribs 18a to 18g extends in the vehicle width direction as shown in FIG. 3 and FIG. 4, with a length in the vehicle width direction of 10 to 50 mm (preferably 30 to 35 mm), for example. The plurality of welding auxiliary ribs 18a to 18g is provided so that each of the apex portions correspond to the curved surface shape of the instrument panel 10 where the incline quickly steepens toward both ends, absorbing the curvature of the airbag cover main body portion 141 and maintaining the flatness of the surface from the opening portion 141a, even in the region further on the outer peripheral side than the opening portion 141a, from the center in the vehicle width direction toward the end portion side (the left side in FIG. 2). FIG. 4A to FIG. 4G show examples of the angles of the welding portion 18 with respect to the airbag cover main body portion 141 for maintaining flatness.

Figure 5:
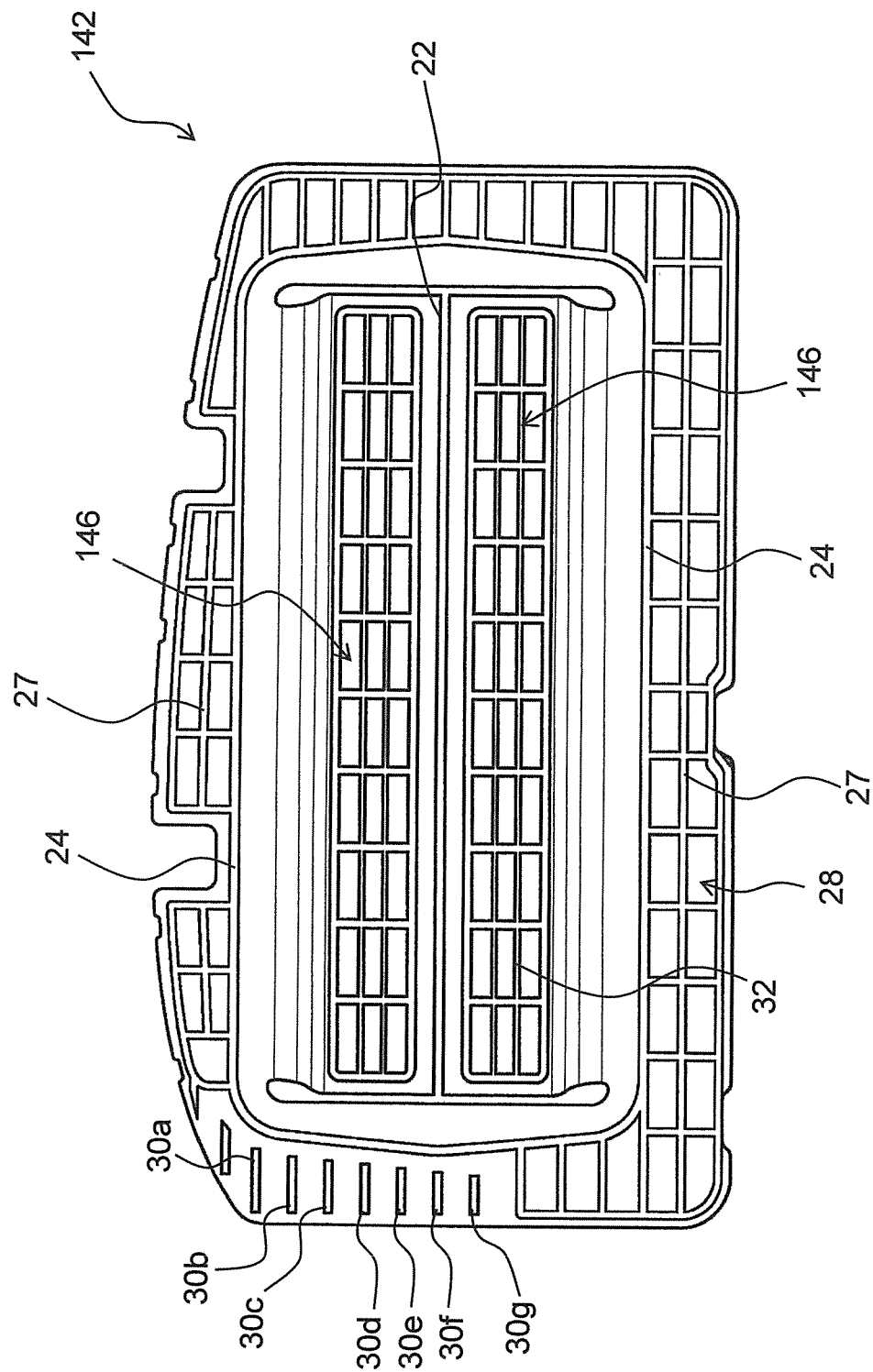
FIG. 5 is a top view of the frame-shaped body.
Figure 6:
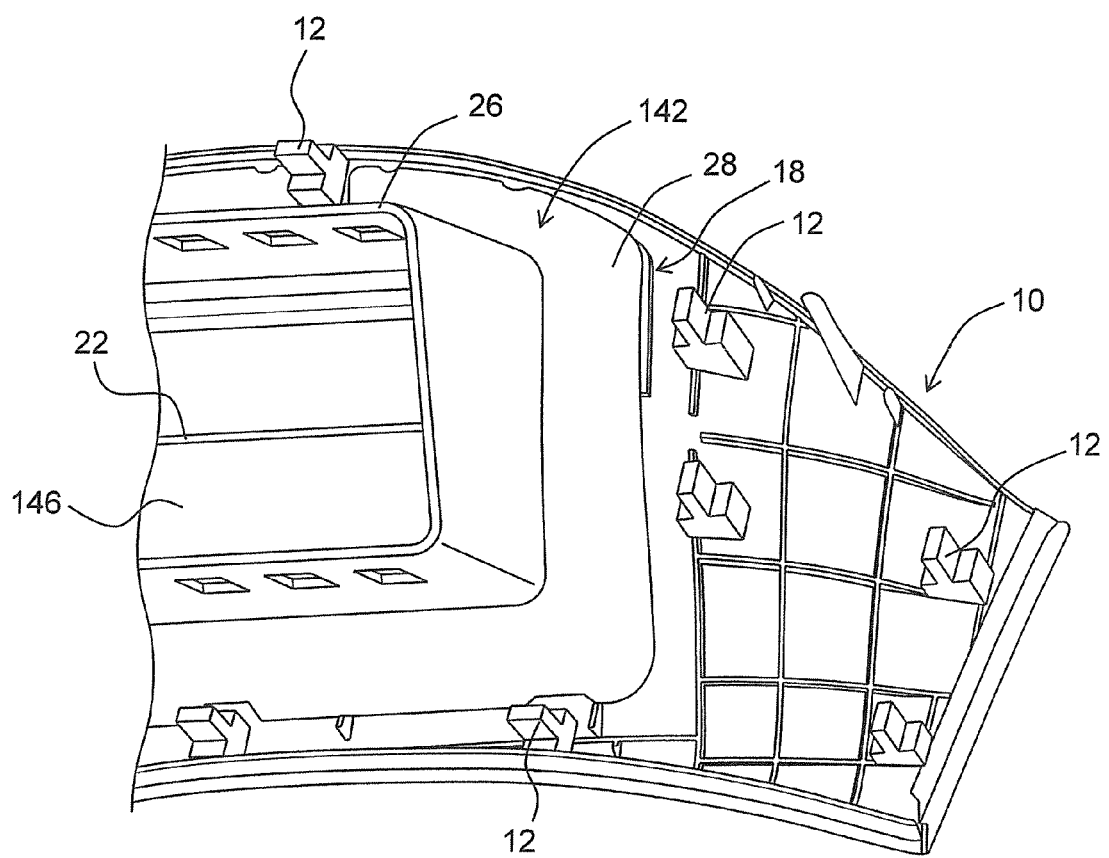
FIG. 6 is a perspective view of the welded portion between the instrument panel and frame-shaped body, as viewed from below.

As shown in FIG. 5 and FIG. 6, the frame-shaped body 142 comprises the flap portion 146 which forms the tear line 22 that is designed for airbag 110 inflation and deployment and is provided in a location corresponding to the tear line 14 of the airbag cover main body portion 141, a first rib 32 formed (in a lattice shape in this example) on the flap portion 146, a flange portion 28 formed further on the outer peripheral side than the flap portion 146, a plurality of auxiliary ribs 30a to 30g to be welded that is formed in a location corresponding to the welding auxiliary ribs 18a to 18g on the flange portion 28, a substantially ring-shaped second rib 24 that has higher strength than the first rib 32 and is provided to the flange portion 28 so as to surround the flap portion 146, a third rib 27 formed in connection with the second rib 24 (in a lattice shape in this example) in a region on the flange portion 28 where the welding auxiliary ribs 18a to 18g are not provided, and a peripheral wall 26 that houses the passenger airbag and is provided below the flange portion 28. Note that the width dimension (thickness) of the auxiliary ribs 30a to 30g to be welded is greater than the width dimension (thickness) of the welding auxiliary ribs 18a to 18g. Also note that the first rib 32, the second rib 24, and the third rib 27 constitute the ribs to be welded in the claims.

Figure 7:
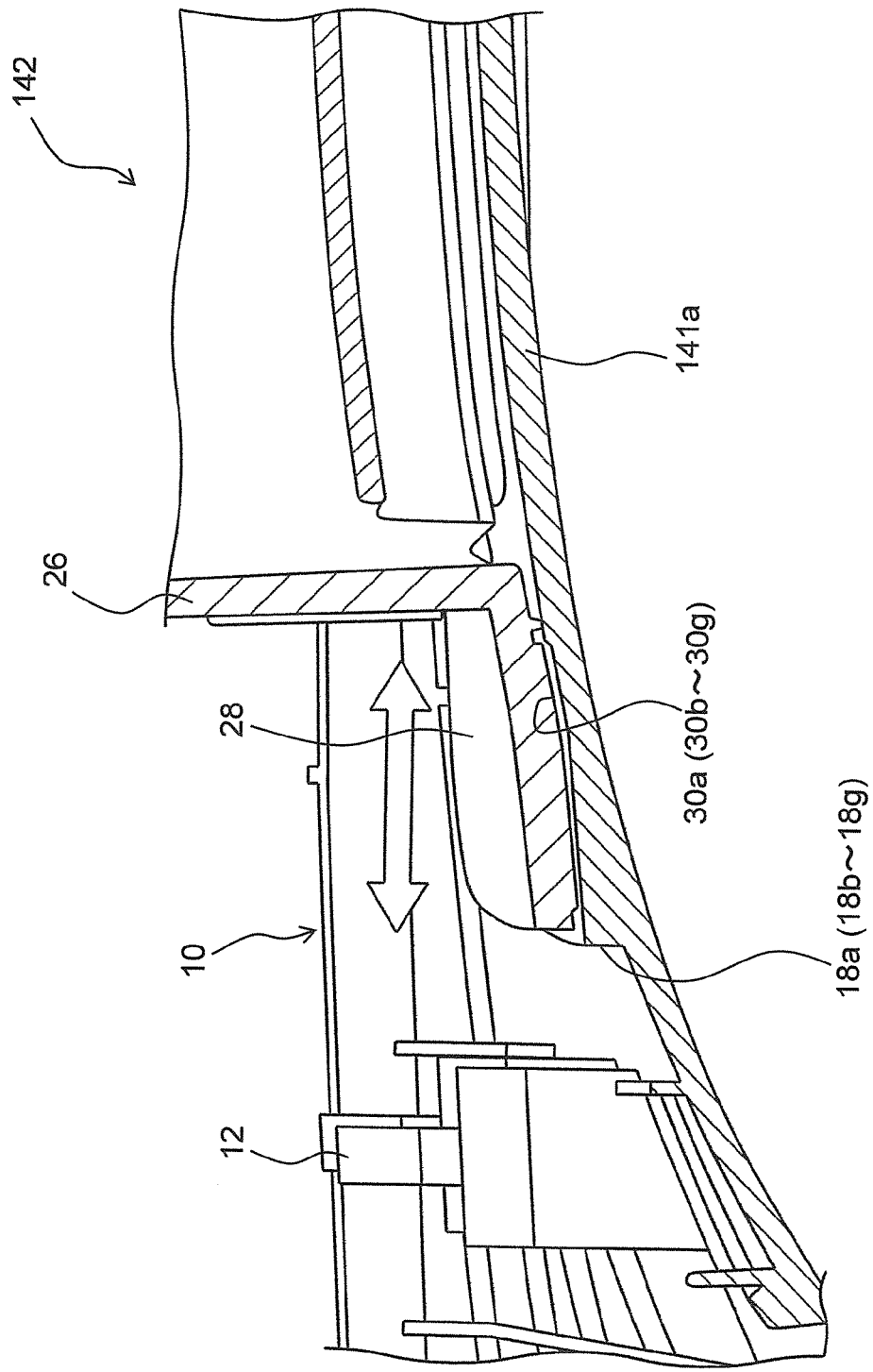
FIG. 7 is an enlarged cross-sectional view of the welded portion between the instrument panel and frame-shaped body.

With the above configuration, vibration welding is performed as shown in FIG. 7, with the frame-shaped body 142 aligned with the airbag cover main body portion 141 so that the first rib 32, the second rib 24, and the third rib 27 are in contact with a flat portion FT, and the auxiliary ribs 30a to 30g to be welded are aligned and in contact with the welding auxiliary ribs 18a to 18g. With this arrangement, the first rib 32, the second rib 24, and the third rib 27 are joined to the flat portion FT, and the auxiliary ribs 30a to 30g to be welded are joined to the welding auxiliary ribs 18a to 18g, causing the airbag cover main body portion 141 and frame-shaped body 142 to be joined as a result.

At this time, the vibration welding vibrates the frame-shaped body 142 in the horizontal direction (refer to the arrow in FIG. 7) while applying pressure toward the instrument panel 10, with the instrument panel 10 in a fixed state, thereby generating frictional heat and causing melting and welding to occur between the ribs which serve as the boundary surface. At this time, the vibration mode may be either linear or orbital, but a linear mode in which vibration occurs along the extended direction of the welding auxiliary ribs 18a to 18g is preferred. Note that an orbital mode may be applied with the maximum amplitude less than or equal to the rib width (1.5 mm or less) at a constant rate with respect to the time axis on all welded surfaces to achieve an even weld as well.

The airbag apparatus 100 is configured with respect to the frame-shaped body 142 welded to the instrument panel 10 as described above by fixing the retainer 120 to the peripheral wall 26 and further mounting the airbag 110, the inflator 130, etc., to the retainer 120, as shown in FIG. 1.

As described above, in the passenger airbag apparatus 100 of the present invention, the inner peripheral side of the opening portion 141a of the airbag cover main body portion 141 of the instrument panel 10 is established as the flat portion FT where ribs, etc., are not provided, and the first rib 32, the second rib 24, and the third rib 27 are provided to the flap portion 146 and the flange portion 28 of the frame-shaped body 142 corresponding to the opening portion 141a, facing the flat portion FT. By thus providing the ribs to the frame-shaped body 142 side and avoiding rib installation to the opening portion 141a where various restrictions exist in terms of structure and strength, the present invention makes it possible to easily improve the joining strength based on a simple structure, compared to the prior art structure in which ribs are provided to the opening portion.

On the other hand, when the outer appearance of the instrument panel 10 constitutes an overall curved surface shape, the shape generally exhibits a curvature that increases toward the end portion side of the instrument panel 10. As a result, as is, it becomes difficult to evenly join the frame-shaped body 142 by vibration welding in this end portion side region having increased curvature. Here, according to this embodiment, the welding surface 18 made of the welding auxiliary ribs 18a to 18g (for maintaining the flatness of the surface from the opening portion 141a in the region further on the outer peripheral side than the opening portion 141a) is provided to the outer peripheral side of the opening portion 141a. With this arrangement, it is possible to increase the joining strength even in the region on the end portion side that exhibits high curvature.

As described above, in the embodiment, in a configuration that joins the frame-shaped body 142 and the airbag cover main body portion 141 on the instrument panel 10 side by vibration welding, it is possible to maintain a high joining strength based on a simple structure.

Further, in particular, according to this embodiment, the first rib 32 is provided to the flap portion 146 and the second rib 24 is further provided to the flange portion 28 so as to surround the flap portion 146 as ribs to be welded and joined with the flat portion FT of the airbag cover main body portion 141. Then, by making the thickness of this second rib 24 larger than that of the first rib 32, it is possible to reliably improve the joining strength based on a simple structure.

Further, in particular, according to this embodiment, the third rib 27 is further provided to the flange portion 28 as a rib to be welded and joined with the flat portion FT of the airbag cover main body portion 141, making it possible to further reliably improve the joining strength.

Further, in particular, according to this embodiment, the width of the welding auxiliary ribs 18a to 18g is smaller than the width of the auxiliary ribs 30a to 30g to be welded. By thus decreasing the width of the welding auxiliary ribs 18a to 18g, it is possible to minimize the adverse effect on the outer appearance as viewed from the front of the instrument panel 10.

Note that, in addition to that already described, techniques of the above embodiment and each modification may be suitably combined as well.

Although other examples are not individually described herein, various changes and modifications can be made without departing from the spirit and scope of the present invention.

What is claimed is:

1. A passenger airbag apparatus provided in a vehicle, comprising:
a passenger airbag that inflates and restrains a passenger;
a retainer that houses said passenger airbag folded in a predetermined form;
an inflator that supplies gas to said passenger airbag so that said passenger airbag protrudes from said retainer and inflates in response to a collision to said vehicle; and
an airbag cover; wherein:
said airbag cover comprises:
an airbag cover main body portion that extends facing said passenger and covers said passenger airbag housed in said retainer provided on a side opposite said passenger; and
a frame-shaped body provided to said airbag cover main body portion, on a side opposite said passenger;
said airbag cover main body portion comprises:
a tear line for airbag cover tearing;
a plate-shaped opening portion that is divided by said tear line and opens and deploys at said tear line by a pressure imparted by an inflation load of said passenger airbag;
a flat portion of a rear surface of said airbag cover main body portion that is opposite to said passenger, and which extends along a region of the rear surface that includes said opening portion; and
a plurality of welding auxiliary ribs that protrude from a region of the rear surface of said airbag cover main body portion that is spaced from said flat portion including said opening portion, and which are configured to have flat surfaces thereof with the flat portion and the flat surfaces providing for optimized vibration welding therewith;
said frame-shaped body comprises:
a tear line for tearing that is provided in a location corresponding to said tear line for airbag cover tearing;
a flap portion that is divided by said tear line and tears and deploys at said tear line by the pressure imparted by the inflation load of said passenger airbag;
a rib to be welded that is provided at least at said flap portion so as to face said flat portion; and
a plurality of auxiliary ribs to be welded that is provided at locations on a flange portion formed on an outer side of said flap portion, respectively corresponding to said plurality of welding auxiliary ribs; and
said airbag cover main body portion and said frame-shaped body are joined together by vibration welding wherein vibration is relatively applied in a vibration direction, with said rib to be welded and said flat portion in contact with each other and said auxiliary ribs to be welded and said flat surfaces of said welding auxiliary ribs in contact with each other.

2. The passenger airbag apparatus according to claim 1, wherein
said rib to be welded of said frame-shaped body comprises:
a first rib provided to said flap portion;
a second rib having a strength that is greater than said first rib, that is provided in a substantially ring shape to said flange portion, surrounding said flap portion; and
a third rib that is provided so that it connects with said second rib in a region of said flange portion where said plurality of auxiliary ribs to be welded is not provided.

3. The passenger airbag apparatus according to claim 1, wherein:
a width of said welding auxiliary rib is smaller than a width of said auxiliary rib to be welded.

* * * * *